United States Patent [19]

Cheung et al.

[11] Patent Number: 4,688,418
[45] Date of Patent: Aug. 25, 1987

[54] METHOD AND APPARATUS FOR DETERMINING MASS FLOW RATE AND QUALITY IN A STEAM LINE

[75] Inventors: Yin L. Cheung, Sugarland; Alfred Brown, Houston, both of Tex.

[73] Assignee: Texaco Inc., White Plains, N.Y.

[21] Appl. No.: 788,286

[22] Filed: Oct. 17, 1985

[51] Int. Cl.⁴ .............................................. G01F 15/08
[52] U.S. Cl. ............................................. 73/29; 73/200
[58] Field of Search ................... 73/29, 200, 861.02, 73/861.04; 374/42; 364/509, 510

[56] References Cited

U.S. PATENT DOCUMENTS

| 3,392,572 | 7/1968 | Brown | 73/29 |
| 3,430,483 | 3/1969 | Clawson et al. | 73/29 |
| 3,537,312 | 11/1970 | Moore | 73/861.03 |
| 4,178,801 | 12/1979 | Cassell et al. | 73/200 X |
| 4,419,898 | 12/1983 | Zanker et al. | 73/861.02 |
| 4,581,926 | 4/1986 | Moore et al. | 73/29 X |

Primary Examiner—Herbert Goldstein
Attorney, Agent, or Firm—Robert A. Kulason; James J. O'Loughlin; Robert B. Burns

[57] ABSTRACT

A method and/or apparatus for determining the mass flow rate and the quality of steam in a flowing line. It involves directing the total flow to a liquid-vapor separator. The separated vapor and liquid have the flow of each metered and the flow of one regulated so as to hold the level of the separated liquid constant. Then, by measuring pressure and temperature of the separated flows upstream from the regulation, the mass flow rate and the quality of the steam may be determined.

1 Claim, 1 Drawing Figure

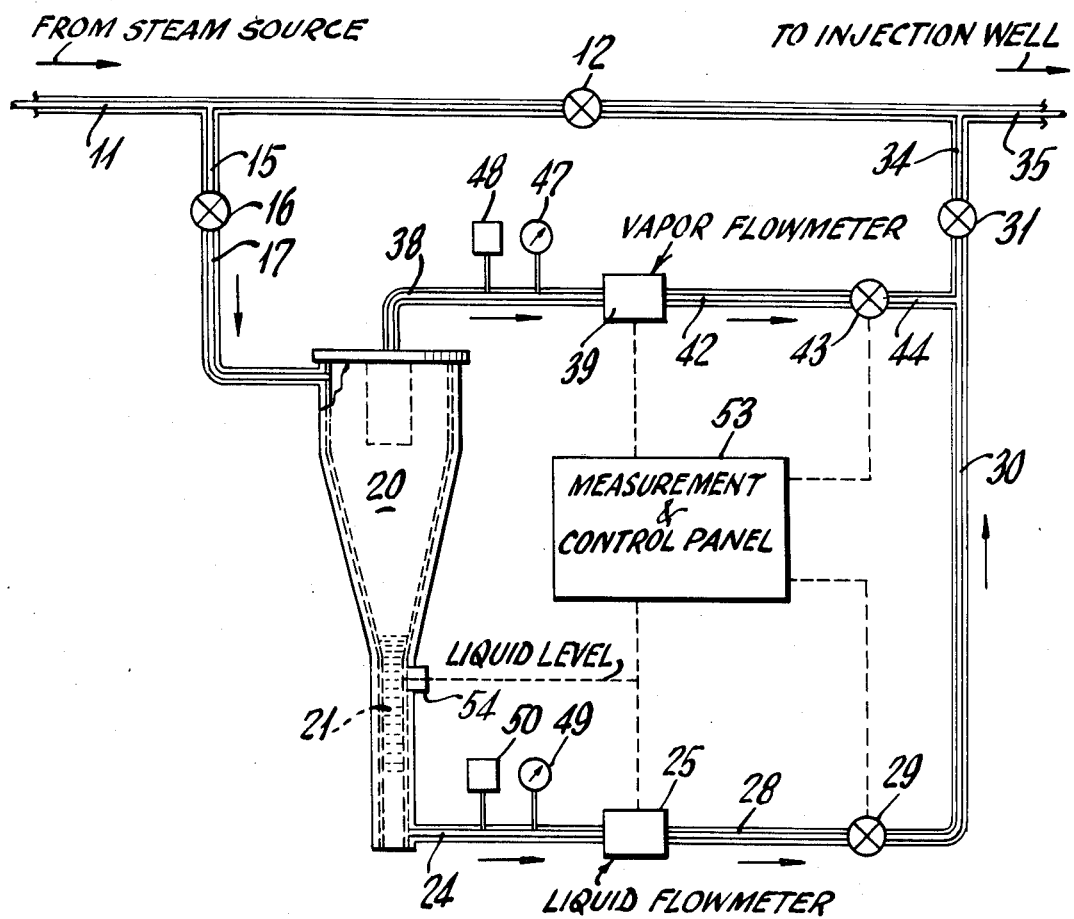

METHOD AND APPARATUS FOR DETERMINING MASS FLOW RATE AND QUALITY IN A STEAM LINE

BACKGROUND OF THE INVENTION

Field of the Invention

This invention concerns measurement of steam quality in general. More specifically, the method concerns a system and/or method which may determine the mass flow rate and the quality of steam in a flow line without prior knowledge of either.

In oil-field steam injection projects and procedures it has been well known that an important aspect is the knowledge of steam mass flow rate and quality at an individual injection well. Heretofore known methods generally require prior knowledge of either mass flow rate or quality in order to determine the other. Consequently, the prior procedures fail when neither quality nor mass flow rate is known and such is the case where two or more injection wells are being supplied by one steam source.

The applicants are aware of the related art that is cited in the accompanying form PTO-1449, but as there indicated, the disclosures thereof are not relevant to the applicants' invention.

SUMMARY OF THE INVENTION

Briefly, the invention is in relation to a steam transmission line, and it concerns a method of determining both steam mass flow rate and quality in said line simultaneously without prior knowledge of either quantity. It comprises the steps of directing the total steam flow in said line to a liquid-vapor separator having a liquid reservoir therein, and directing the separated streams of vapor and liquid through separate flow meters. It also comprises controlling the flow rate of at least one of said separated streams downstream from said flow meters to maintain the liquid level in said reservoir constant, and measuring the flow rates, the pressures and the temperatures of each of said separated streams while said liquid level remains constant whereby said steam mass flow rate and quality may be determined for said steam transmission line.

Again briefly, the invention is in combination with a steam line for supplying a steam injection well or the like, and it concerns a system for determining both steam mass flow rate and quality where neither of these is known. It comprises means for diverting total steam flow from said line to a liquid-vapor separator having a liquid reservoir, and means for passing separated vapor and liquid streams through single-phase flow meters for measuring vapor and liquid flow rates. The said single-phase flow meters comprise an orifice-plate vapor flow meter and a liquid dump-meter, respectively. It also comprises means for measuring pressure and temperature of said separated vapor and liquid streams, and means for throttling at least one of said separated streams for maintaining the level of said liquid reservoir constant. The said means for throttling comprises throttle valves in said separated streams located downstream from said meters. the system also comprises means for rejoining said separated streams after said throttling, all whereby said total mass flow rate and quality may be determined.

BRIEF DESCRIPTION OF THE DRAWINGS

The foregoing and other objects and benefits of the invention will be more fully setforth below in connection with the best mode contemplated by the inventors of carrying out the invention, and in connection with which there are illustrations provided in the drawings, wherein:

the FIGURE of drawing shows a schematic system illustrating the apparatus necessary for carrying out the invention.

DESCRIPTION OF THE PREFERRED EMBODIMENT

The drawing illustrates a system for carrying out the invention and it will be observed that there is a steam line conduit 11 through which the steam is flowing. The steam is being directed to an injection well (as indicated) or the like. The steam line 11 connects directly to a valve 12 in the line. This valve 12 will be closed during the determination concerning mass flow rate and quality.

There is a branching conduit 15 which carries the entire flow from conduit 11 when the system is in operation. There is another valve 16 in the conduit 15 which will remain fully open during the system's operation. A conduit 17 continues from the other side of the valve 16 and connects with the input of a cyclone separator 20. It will be understood that other and different types of separators might be employed, so long as the separation obtained is substantially complete, viz-a-viz vapor and liquid. At the bottom of the cyclone separator 20 there is a reservoir 21 where the separated liquid gathers. Near the bottom of the reservoir 21 there is an outlet pipe or conduit 24 that connects to a liquid flow meter 25. It will be understood that any feasible single phase liquid flow meter might be employed. However, preferably it is of a type called a liquid dump-meter.

There is an outlet pipe 28 from the liquid flow meter 25 to a throttle valve 29. From the throttle valve 29, a pipe or conduit 30 connects to another valve 31 which will normally be open during the operation of the system. On the other side of valve 31, a pipe 34 connects into an outlet pipe 35 that carries the flowing steam to the injection well or other use for the steam.

At the top of the cyclone separator 20 there is an outlet conduit 38 that carries the separated vapor phase to a vapor flow meter 39. This flow meter may be any feasible single phase vapor meter, such as an orifice-plate vapor flow meter. There is a conduit 42 from the outlet side of flow meter 39 that goes to a throttle valve 43. On the outlet side of valve 43 there is a conduuit 44 that connects into the pipe 30.

There is a pressure meter 47 and a temperature indicator 48 that both connect into the line or pipe 38 between the vapor flow meter 39 and the outlet from the cyclone separator 20. Similarly, there is a pressure meter 49 and a temperature indicator 50 that are connected into the line or pipe 24 which goes from the bottom of the cyclone separator 20 and is carrying the liquid phase fluid.

There is a measurement and control panel 53 illustrated. It has connections to the flow meters and throttle valves, as well as to a liquid level sensor 54. As will appear more fully below, the measurement and control may be carried out manually or could be performed automatically using any feasible system, e.g., a computerized system. In operation, one or both of the throttle valves 29 and 43 are controlled in order to maintain the liquid level in reservoir 21 constant, as determined by the liquid level sensor 54. When steady-state conditions have been established, the measurements of flow rates by flow meters 25 and 39 plus the pressures and temperatures of each of the separated streams, are determined. The total mass flow rate and quality of the steam may then be calculated from those measurements in accordance with the more complete explanation which follows.

It may be noted that the total mass flow rate remains the same throughout the flow system. The steam quality will, of course, decrease, but only by a negligible amount which would be determined by the amount of heat loss from the system to the environment. However, it will be noted that the system is well insulated throughout in order to minimize that aspect. Thus, the total mass flow rate remains the same in accordance with the following expression:

$$m_1 = m_2 + m_3 \tag{1}$$

where:

$m_1$ is the total mass flow rate of the stream being measured;
$m_2$ is the mass flow rate of the vapor; and
$m_3$ is the mass flow rate of the liquid.

Equation (1) may be expanded to $$m_1[x_1 h_{g1} + (1-x_1) h_{f1}] = m_2 h_{g2} + m_3 h_{f3} + Q_L \tag{2}$$

wherein:

$m_1$ is the mass flow rate at conduit 15,
$h_{f1}$, $h_{g1}$ are the enthalpies of the saturated liquid and vapor, respectively, at conduit 15,
$x_1$ is the steam quality at conduit 15, and
$Q_L$ is the heat loss from the separator system.

For a well-insulated flow system, the heat loss is small compared to the flow enthalpy and can be neglected. Therefore $$m_1[x_1 h_{g1} + (1-x_1) h_{f1}] = m_2 h_{g2} + m_3 h_{f3} \tag{3}$$

EXAMPLE

In accordance with the foregoing relationships, the determination of mass flow rate and quality of the total steam flow being measured may be determined in accordance with the following example. At steady-state conditions, the following measurements are obtained:

$m_2 = 12,000$ lbs./hr.
$m_3 = 3,000$ lbs./hr.
$P_1 = 960$ psia (at conduit 15)
$P_2 = 940$ psia (at conduit 38)
$P_3 = 940$ psia (at conduit 24)

Then, from equation (1) we have the following $$m_1 = 12,000 + 3,000 = 15,000 \text{ lbs./hr.}$$

And, from steam tables (Keenan and Keyes) the saturation enthalpies may be looked up for the stations at conduit 15 (1), conduit 38 (2) and conduit 24 (3) as follows:

$h_{f1} = 536.2$ Btu/lb.
$h_{g1} = 1193.9$ Btu/lb.
$h_{g2} = 1194.6$ Btu/lb.
$h_{f3} = 533.0$ Btu/lb.

Then solving for $x_1$ in Equation (3) we get $x_1 = 80\%$

It may be noted that a variation of the described system and operation in the foregoing, might be employed. Under certain operating conditions it might improve the results. Thus, by collecting the separated liquid in a holding tank (not shown) for the duration of a test, the accumulated liquid volume divided by the duration of test will also provide the average liquid flow rate.

While the foregoing explanation and description has described the invention in considerable detail in accordance with the applicable statutes, this is not to be taken in any way limiting the invention but merely as being descriptive thereof.

We claim:

1. Method for measuring particular characteristics of steam comprising water and vapor, flowing in a line which communicates an apparatus in which said steam is generated to the point of use thereof, toward determining the steam mass flow rate and quality, which method comprises the steps of:

diverting the total steam flow from said line into a liquid-vapor separator having a liquid holding reservoir, and in which separator discrete streams of liquid and vapor are formed, directing the discrete streams of vapor and liquid through separate flow meters, each flow meter being capable of measuring the rate at which fluid is passing therethrough, adjusting the rate at which vapor is flowing through said one flow meter until the amount of liquid held in said separator reservoir remains at a constant level, and measuring the respective flow rates, pressures, and temperatures of each of said discrete liquid and vapor streams while said liquid level in said reservoir remains constant.

* * * * *